United States Patent [19]
Chow et al.

[11] 3,915,979
[45] Oct. 28, 1975

[54] PREPARATION OF BENZOTRIAZOLE-2-CARBOXAMIDES

[75] Inventors: Alfred W. Chow, Radnor; Arnold J. Krog, Havertown; Gregory Gallagher, Collegeville, all of Pa.

[73] Assignee: SmithKline Corporation, Philadelphia, Pa.

[22] Filed: Nov. 13, 1972

[21] Appl. No.: 306,105

[52] U.S. Cl. .............................. 260/308 B; 424/269
[51] Int. Cl.² ........................................ C07D 249/18
[58] Field of Search ................................ 260/308 B

[56] References Cited
UNITED STATES PATENTS
3,732,238  5/1973  Baker et al. .................... 260/308 R
3,808,334  4/1974  Dahle ............................. 260/308 R FOREIGN PATENTS OR APPLICATIONS
2,117,464  10/1972  Germany ........................ 260/308 B
990,111    4/1965   United Kingdom ............. 260/308 R

*Primary Examiner*—Henry R. Jiles
*Assistant Examiner*—Robert T. Bond
*Attorney, Agent, or Firm*—William H. Edgerton

[57] ABSTRACT

Benzotriazole-2-carboxamides having anthelmintic activity are prepared by 2-acylating a 4,7-dihalobenzotriazole then removing the 4,7-dihalo groups by catalytic hydrogenation at low temperatures and pressures. Hydrogenation at higher temperatures and pressures give 4,5,6,7-tetrahydrobenzotriazole-2-carboxamides also having anthelmintic activity.

8 Claims, No Drawings

PREPARATION OF BENZOTRIAZOLE-2-CARBOXAMIDES

This invention relates to new methods for preparing 2-carbamoylbenzotriazoles and certain 2-carbamoyl tetrahydrobenzotriazoles prepared by these methods.

It is known to the art that certain N-alkylatedcarbamoylbenzotriazoles have activity as anthelmintic agents such as against Haemonchus infestations. The preparation of the chemicals by conventional direct N-acylation procedures was found to yield a mixture of the 1- and 2-acylbenzotriazoles with the 1-isomer heavily predominating. The anthelmintic activity was most pronounced with the 2-isomer.

We have now found a convenient synthesis of 2-carbamoylbenzotriazoles(benzotriazole-2-carboxamides) which gives good yields of the 2-isomer. Unexpectedly, polyhalobenzotriazoles having specific halo substituents in the benzo ring acylate at the 2-position almost exclusively, for example, using the appropriately substituted N-alkylated carbamoylchloride in inert solvent in the presence of a tertiary amine. The resulting polyhalobenzotriazole-2-carboxamide is then dehalogenated by catalytic hydrogenation at below room temperature, most appropriately at from 0°–15°C. using any common catalyst used for catalytic dehalogenation such as palladium-on-carbon in the presence of a tertiary amine for use as an acid scavenger at low pressures such as from about 5–25 pounds of hydrogen. The resulting product is the desired benzotriazole-2-carboxamide.

To our knowledge, halobenzotriazoles have not been reported previously to acylate at the 2-position exclusively. Such compounds have previously been reported to alkylate at the 2-position, R. C. Wiley et al., J.Am.-Chem.Soc., 77 S, 5105 (1955); 79 S, 4395 (1957) but the mechanism of alkylation reactions differs from that of acylation reactions. The nub of this aspect of the invention is the fact that certain 4,7-substituents of the benzotriazole nucleus direct acylation into the 2- position.

U. K. Pat. No. 990,111 reports the N-acylation of various benzotriazoles at both the 1,2-positions. Kreutzgerger, Arzneim.-Forsch., 20, 1723 (1970) reports exclusive 1-acylation using aroyl halides. This is also true in Ger. Offen. 1,912,416 (C.A.72, 66948) among several other publications.

The processes of this invention may be exemplified by the following reaction:

or bromo at either the 5 or 6 position; R and $R_1$ are, respectively, branched or unbranched alkyl groups of from 1-18 carbons. In the structural formulae the form of I-III is written as the 2-H structure rather than the tautomeric 1-H form.

It will be appreciated that bromo or preferably chloro groups must be substituted at least at both the 4 and 7 positions to direct the desired 2-acylation reaction. We have also found that 4,7-dimethoxy substitution also directs N-acylation to the 2-position. However, in this case the subsequent hydrogenation step (II → III) of course does not occur. This illustrates however that various 4,7-disubstitutedbenzotriazole-2-carboxamides can be prepared easily and in good yield.

It is preferred that all the X and Y substituents be chloro for the most economical preparation of the benzotriazole-2-carboxamides (III) which have anthelmintic activity due to the relative ease of preparing the 4,5,6,7-tetrachlorobenzotriazole starting material.

The 2-acylation step of this invention (I → II) can be carried out over a wide range of equivalent conditions. Most readily it is carried out using a slight excess of the dialkylcarbamoyl chloride and a tertiary amine such as those conventionally used to accept the hydrogen chloride eliminated during condensation reactions. Typical tertiary amine bases are triethylamine, pyridine, dimethylaniline, pyrrolidine, N-methylpiperidine, etc. The solvent is an inert one in which the reactants are substantially soluble and which is nonreactive with the acylating agents. Less advantageously an excess of the tertiary amine can be used as solvent. Exemplary solvents are dioxane, acetone, ethyl ether, butyl ether, tetrahydrofuran, tetrahydropyran, dimethylformamide or dimethylacetamide. The solvent, of course, is not a critical part of the reaction.

Most conveniently the polyhalobenzotriazole, dialkylcarbamoyl chloride, tertiary amine and solvent are heated at reflux for from about 1 to 12 hours with stirring. The temperature and time of reaction are proportional to the completion of the acylation reaction as will be recognized by those skilled in the art. In fact, the acylation will proceed at room temperature but at a slower rate. The reaction mixture may be worked up by methods obvious to those skilled in organic chemistry.

Overall, therefore, one aspect of the present invention is the discovery that certain benzotriazoles (Formula I in which X is chloro, bromo or methoxy) can be specifically 2-acylated in contrast to what one would expect. The literature describes mostly 1-acylation but at best a mixture of 1 and 2-acylation with the former predominating.

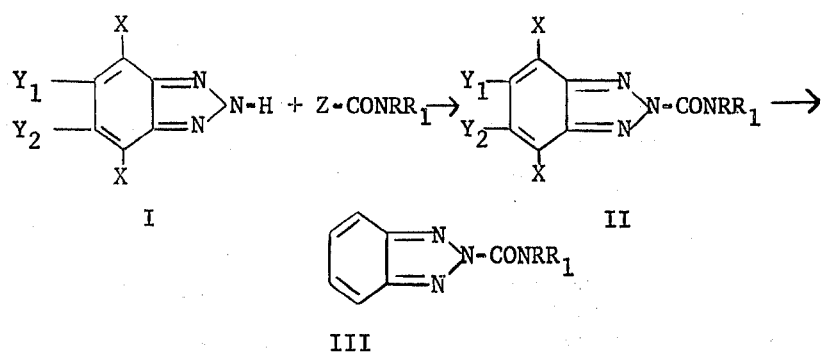

Z is chloro or bromo; in which X is necessarily either chloro or bromo; and $Y_1$ and $Y_2$ are hydrogen, chloro In the second step of this process, the polyhalobenzotriazole-2-carboxamide of Formula II is hydrogenated in a standard hydrogenation solvent most conveniently in ethanol, methanol, isopropanol etc. with a tertiary amine as described above, most conveniently triethylamine in quantities stoichiometrically equal or in excess of the halogen atom present, with a dehalogenating hydrogenation catalyst such as a palladium catalyst. The hydrogenation is carried out at low temperature, from about 0°–25°C. preferably at about 5°–10°C. at low pressures of hydrogen such as from 5–25 lbs., preferably about 10–15 lbs. The hydrogenation is continued on an apparatus such as the Parr low pressure hydrogenator until the theoretical amount of hydrogen is absorbed, usually about 30–90 minutes. The desired benzotriazole-2-carboxamide of Formula III is then isolated by standard techniques.

We have also unexpectedly discovered a new class of benzotriazole-2-carboxamides are formed by carrying out the hydrogenation at more normal temperature and pressure conditions, for example, at from about room temperature (at 37°C.) up to about 50°C. and pressures of from 40–60 lbs. until the reaction is complete. These new compounds are the 4,5,6,7-tetrahydro congeners related to those of Formula III above. These compounds are active anthelmintic agents. For example, N-n-heptyl-N-methyl-4,5,6,7-tetrahydrobenzotriazole-2-carboxamide administered in 15 mg./kg. as an oral drench to naturally infected sheep reduced Haemonchus 95%, Ostertagia 81%, Strongyloides 97% and Trichuris 86%. These compounds are considered a part of our invention.

The following examples will give more details of specific aspects of this invention.

EXAMPLE 1

A mixture of 5.1 g. of 4,5,6,7-tetrachlorobenzotriazole, 3.75 g. of N-methyl-N-heptylcarbamoyl chloride, 6 ml. of triethylamine and 150 ml. of dioxane is heated at reflux overnight. The mixture is evaporated to dryness and partitioned between a mixture of 1:1 petroleum ether - ether and water. The organic layer is washed with dilute sodium hydroxide, water then dried. Evaporation gives 4,5,6,7-tetrachlorobenzotriazole-N-methyl-N-heptylcarboxamide as an oil.

A solution of 4.12 g. (0.01 mole) of the carboxamide in 200 ml. of ethanol in a Parr bottle is cooled to 5°C. at which point 4.05 g.(0.04 mole) of triethylamine and 3.0 g. of 5 percent palladium-on-carbon are added. The bottle is placed on a Parr shaker under 10 p.s.i. of hydrogen at about 5°C. for 40 minutes. The catalyst is separated by filtration. The residue after evaporation on a rotary evaporator is taken into ether. The ether extract is washed with dilute hydrochloric acid, water, 5 percent sodium carbonate and water. The dried ether extract is evaporated to give, after chromatography, N-heptyl-N-methylbenzotriazole-2-carboxamide as an oil (62%).

EXAMPLE 2

A solution of 4.12 g (0.01 mole) of N-heptyl-N-methyl-4,5,6,7-tetrachlorobenzotriazole-2-carboxamide, 1.0 g. of 10 percent palladium-on-charcoal, 4.05 g. (0.04 mole) of triethylamine and 100 ml. of ethanol is hydrogenated on a Parr shaker at 50 lbs. at ambient temperature. After two hours, the uptake of hydrogen is complete. After working up as described in Example 1, the product is a liquid, N-n-heptyl-N-methyl-4,5,6,7-tetrahydrobenzotriazole-2-carboxamide (90%), Anal. calculated for $C_{15}H_{26}N_4O$, C=64.72; H=9.41; N-20.12. Found: C=64.42; H=9.43; N=18.89.

The corresponding tetrahydro-N-lauryl-N-methylcarboxamide (82%) and tetrahydro-N-pentyl-N-methylcarboxamide (89%), have been prepared similarly, combining the acylation step of Example 1 and the hydrogenation step of Example 2.

EXAMPLE 3

A solution of 1.3 g. (0.0069 mole) of 4,7-dichlorobenzotriazole (J. Am. Chem. Soc., 79,4395), 1.47 g. (0.00816 mole) of N-heptyl-N-methylcarbamoyl chloride, 7.8 ml. of tetrahydrofuran and 1.13 ml. (0.00816 mole) of triethylamine is heated at reflux for 30 minutes then stirred at room temperature for 18 hours. After working up as in Example 1, 4,7-dichloro-N-heptyl-N-methylbenzotriazole-2-carboxamide.

EXAMPLE 4

Repeating the reactions of Examples 1 and 2 with 4,5,6,7-tetrabromobenzotriazole (U.K. 990,111) and N,N-dibutylcarbamoyl chloride gives successively N,N-dibutyl-4,5,6,7-tetrabromobenzotriazole-2-carboxamide, N,N-dibutyl benzotriazole-2-carboxamide and N,N-dibutyl-4,5,6,7-tetrahydrobenzotriazole-2-carboxamide. Similarly 4,6,7-tribromo-5-chlorobenzotriazole or 4,5,7-trichlorobenzotriazole (U.K. 990,111) may be used as starting materials in these reactions. Also N-methyl-N-hexylbenzotriazole-2-carboxamide, N-methyl-N-octylbenzotriazole-2-carboxamide, N-methyl-N-nonylbenzo-triazole-2-carboxamide, N-methyl-N-stearylbenzotriazole-2-carboxamide, N-isopentyl-N-methylbenzotriazole-2-carboxamide as well as their tetrahydro derivatives are prepared using the appropriate known dialkylcarbamoyl chloride and 4,5,6,7-tetrachlorobenzotriazole.

EXAMPLE 5

A mixture of 2.0 g. of 4,7-dimethoxybenzotriazole, [prepared from diazotization of 3,6-dimethoxy-o-phenylenediamine J.Org.Chem., 26 462 (1961)], 20 ml. of tetrahydrofuran, 3 ml. of triethylamine and 2.16 g. of N-methyl-N-heptylcarbamoyl chloride is heated at reflux for 4 hours. The mother filtrate is separated and evaporated. Ether extraction gives N-heptyl-N-methyl-4,7-dimethoxybenzotriazole-2-carboxamide, m.p. 98°–100°C.

This compound is an active anthelmintic agent.

What is claimed is:

1. The method of preparing selectively 2-acylated benzotriazoles comprising reacting a 2-unsubstituted benzotriazole having chloro, bromo, or methoxy at both the 4 and 7-positions with an acyl halide of the formula:

$RR_1NCOZ$ in which Z is chloro or bromo; R and $R_1$ are alkyl of from 1-18 carbon atoms;

in the presence of a tertiary amine scavenging agent in a solvent in which the reactants are mutually soluble at a temperature of from room temperature up to the reflux temperature of the reaction mixture.

2. The method of claim 1 in which [the acyl halide has the formula:

RR₁NCOZ in which Z is chloro or bromo; R and R₁ are alkyl of from 1-18 carbon atoms; and] the tertiary amine is triethylamine, pyridine, dimethylaniline, pyrrolidine, or N-methylpyridine.

3. The method of preparing benzotriazole-2-carboxamides of the formula:

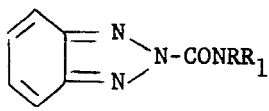

in which R and R₁ are alkyl of from 1-18 carbon atoms; comprising reacting a polyhalobenzotriazole of the formula:

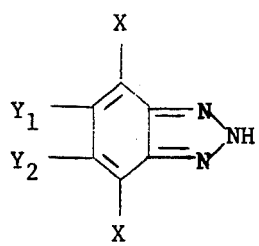

in which X is chloro or bromo and $Y_1$ and $Y_2$ are, respectively, hydrogen, chloro or bromo, with a dialkylcarbamoyl halide of the formula:

RR₁NCOZ in which R and R₁ are, respectively, alkyl of from 1–18 carbon atoms and Z is chloro or bromo in a solvent in which the reactants are soluble at a temperature of from about room temperature up to the reflux temperature of the reaction mixture to form a polyhalobenzotriazole-2-carboxamide of the formula:

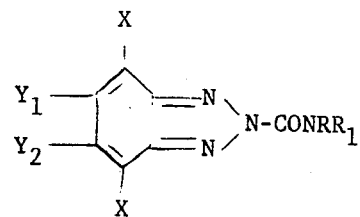

in which $Y_1$, $Y_2$, X, R and R₁ are as defined above; then reacting said polyhalobenzotriazole-2-carboxamide under low pressure hydrogenation conditions in about 5–25 p.s.i. hydrogen at from about 5°–10°C. in the presence of a palladium catalyst and a tertiary amine scavenging agent, the latter in at least a quantity stoichiometric with the halo substituents of the polyhalobenzotriazole-2-carboxamide.

4. The method of claim 3 in which $Y_1$, $Y_2$ and X are chloro.

5. A compound of the formula:

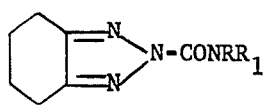

in which R and R₁ are alkyl of 1–18 carbon atoms.

6. The compound of claim 5 in which R is N-heptyl and R₁ is methyl.

7. The compound of claim 5 in which R is N-pentyl and R₁ is methyl.

8. The compound of claim 5 in which R is lauryl and R₁ is methyl.

* * * * *